United States Patent
Thumm et al.

(10) Patent No.: US 10,082,175 B2
(45) Date of Patent: Sep. 25, 2018

(54) SLIDING ELEMENT HAVING A LAYER SYSTEM

(71) Applicant: WIELAND-WERKE AG, Ulm (DE)

(72) Inventors: Gerhard Thumm, Erbach (DE); Volker Voggeser, Senden (DE); Juergen Meyer, Kempten (DE)

(73) Assignee: WIELAND-WERKE AG, Ulm (DE)

( * ) Notice: Subject to any disclaimer, the term of this patent is extended or adjusted under 35 U.S.C. 154(b) by 321 days.

(21) Appl. No.: 14/682,392

(22) Filed: Apr. 9, 2015

(65) Prior Publication Data

US 2015/0300408 A1     Oct. 22, 2015

(30) Foreign Application Priority Data

Apr. 19, 2014   (DE) .................. 10 2014 005 805

(51) Int. Cl.

| | |
|---|---|
| *F16C 33/20* | (2006.01) |
| *F16C 33/12* | (2006.01) |
| *F16C 33/04* | (2006.01) |
| *F16C 33/24* | (2006.01) |
| *C23C 30/00* | (2006.01) |
| *F16C 33/10* | (2006.01) |

(52) U.S. Cl.

CPC .......... *F16C 33/043* (2013.01); *C23C 30/00* (2013.01); *F16C 33/24* (2013.01); *F16C 33/103* (2013.01); *F16C 33/125* (2013.01); *F16C 2202/04* (2013.01); *F16C 2204/10* (2013.01); *F16C 2204/52* (2013.01); *F16C 2206/42* (2013.01); *F16C 2240/48* (2013.01); *F16C 2240/60* (2013.01)

(58) Field of Classification Search

CPC .......... F16C 33/201; F16C 33/12; B05D 5/06
USPC .......... 508/100, 103, 107; 427/198
See application file for complete search history.

(56) References Cited

U.S. PATENT DOCUMENTS

| | | |
|---|---|---|
| 3,961,104 A | 6/1976 | Tanner |
| 4,125,637 A | 11/1978 | Tanner |
| 5,433,531 A | 7/1995 | Thompson |
| 5,702,769 A | 12/1997 | Peters |
| 6,146,019 A | 11/2000 | Andler et al. |
| 6,263,575 B1 | 7/2001 | Andler et al. |
| 7,229,699 B2 | 6/2007 | Toth et al. |

FOREIGN PATENT DOCUMENTS

| | | |
|---|---|---|
| DE | 27 15 432 A1 | 10/1977 |
| DE | 198 24 310 C1 | 8/1999 |
| DE | 103 567 84 A1 | 7/2006 |
| EP | 0 725 158 A1 | 8/1996 |

OTHER PUBLICATIONS

Office Action of German Patent Office issued in Application No. 10 2014 005 805.0 dated Feb. 25, 2015 (5 pages).

*Primary Examiner* — Vishal V Vasisth
(74) *Attorney, Agent, or Firm* — Flynn Thiel, P.C.

(57) ABSTRACT

A sliding element which has a main body and a layer system which is applied thereto. The layer system has at least a first layer of the thickness $s_1$, which is applied to the main body, and hard material particles having a mean extent d, which are introduced into the first layer and are therefore at least fixed on the main body. The thickness $s_1$ of the first layer is such that it amounts to at least 60% and at most 90% of the mean extent d of the hard material particles, and the hard material particles form a surface structuring of the sliding element.

18 Claims, 1 Drawing Sheet

SLIDING ELEMENT HAVING A LAYER SYSTEM

FIELD OF THE INVENTION

Figure 1:
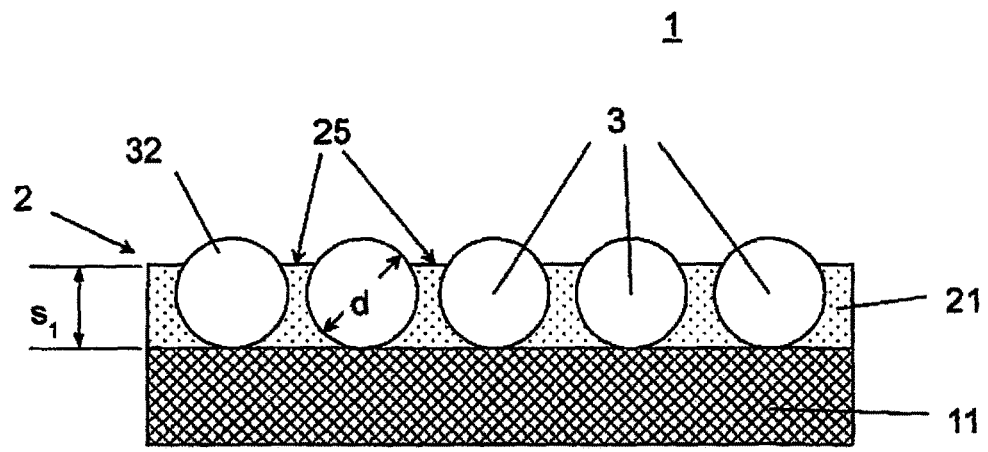

The invention relates to a sliding element having a layer system.

BACKGROUND OF THE INVENTION

Sliding elements are used in bearing systems having a bearing pair made up of at least one bearing and a running partner. The bearing and the running partner each have at least one running surface. A characteristic feature of plain bearings is a relative movement between the bearing and the running partner along the running surfaces. The relative movement causes significant frictional forces and therefore a loss in power. In motor-driven applications, for example in connecting rod bearings, this loss in power has to be compensated for by an additional outlay on fuel. In addition, the frictional forces also lead to wearing of the components.

It is known that the friction conditions in a plain bearing can be improved by suitable coatings of the running surfaces. In particular, coatings serve as run-in layers. Run-in layers can compensate for dimensional tolerances on the components of the bearing.

DESCRIPTION OF THE PRIOR ART

U.S. Pat. No. 7,229,699 B2 discloses a plain bearing having a layer system comprising hard material particles. The hard material particles are completely incorporated in a specific hard particle layer. They have a mean size of between 0.5 and 150 μm and they are considerably smaller than the thickness of the hard particle layer. The hard particle layer is located between a bearing metal and further layers. The outermost layer is a protective layer. Structuring of the surface is not specified in more detail.

Furthermore, DE 103 56 784 A1 discloses a sliding element having a sliding layer. The sliding layer consists of a cavity-forming supporting structure in combination with a sliding material. The material of the supporting structure has a higher strength than the sliding material. Structuring of the surface is not disclosed.

EP 0 725 158 A1 discloses a composite coating resistant to sliding wear as the running layer of piston rings. Hard material particles and particles of a solid lubricant are embedded in a binder alloy, the hard material particles being smaller than the lubricant particles. The coating is applied by thermal spraying. The thickness of the composite coating is considerably greater than the mean size of the powder particles containing the hard material particles and the binder alloy phases. Structuring of the surface by the hard material particles is not disclosed.

Furthermore, DE 198 24 310 C1 describes a plain bearing having a sliding layer. The surface of the sliding layer has round elevations and depressions. The sliding layer consists of a metallic alloy, which is applied to a support body by means of electron beam evaporation. The sliding layer does not contain any hard material particles.

The invention is based on the object of specifying improved sliding elements for bearing systems. In particular, a suitable layer system on at least one running surface is intended to improve the run-in behavior of the bearing system. The layer system should be suitable for bearing systems with a high accuracy of fit and should display its full functionality even with a small thickness.

The invention is portrayed by the features, advantageous embodiments and developments of the invention.

The invention encompasses a sliding element, which consists at least of a main body and a layer system applied thereto. The main body can in this respect preferably comprise a component which consists of a metallic bearing material. The layer system comprises at least a first layer of the thickness $s_1$, which is applied to the main body, and hard material particles having a mean extent d, which are introduced into the first layer and are therefore at least fixed on the main body. According to the invention, the thickness $s_1$ of the first layer is such that it amounts to at least 60% and at most 90% of the mean extent d of the hard material particles. Furthermore, the hard material particles form a surface structuring of the sliding element.

The invention is based on the consideration here that structured surfaces bring about an improved run-in behavior of plain bearings. During the run-in operation, hard material particles exert a polishing effect on the counter running surface of the bearing pair. The hard material particles are fixed on the surface of the main body by means of a suitable layer. The hard material particles are fixed in the layer by mechanical grasping. For this purpose, the thickness $s_1$ of the first layer amounts to at least 60% of the mean extent d of the hard material particles. It is therefore possible for many of the hard material particles to be immersed in the first layer to an extent of at least 60% of their extent. In the most expedient case, the mechanical grasping of the hard material particles is achieved by undercuts, which the material of the first layer forms around a hard material particle. The hard material particles then sit with part of their volume as in a cavern. The thickness $s_1$ of the first layer amounts to at most 90% of the mean extent d of the hard material particles. As a result, many of the hard material particles can be supported on the main body of the sliding element and at the same time provide the outer surface of the sliding element with a structuring according to the invention. Hard material particles which are supported on the main body cannot sink further into the first layer under loading. The expedient properties of the surface of the sliding element are thereby preserved.

According to the invention, the hard material particles are incorporated into the layer in such a manner that a surface structuring caused by the hard material particles is formed on the surface of the layer system. In this respect, it is possible on the one hand that parts of the hard material particles protrude like islands out of the surface of the topmost layer of the layer system. These raised, exposed regions therefore directly represent the surface structuring. On the other hand, it is also possible that the hard material particles are covered by the topmost layer of the layer system, but the entire layer system is configured in such a way that a topography with raised regions is formed on the surface of the layer system. In the raised regions, hard material particles are located beneath the outer surface of the layer system. The hard material particles are overgrown by the layer, with the surface topography being retained. The raised regions likewise form a surface structuring according to the invention. Layer systems of this type can be formed, for example, by physical or chemical vapor deposition methods. It is also possible that a combination of the two variants described is present. It is preferable that the individual hard material particles can be spaced apart from one another. This makes it possible to achieve a pronounced surface structuring.

The surface structuring according to the invention provides a sliding element with a surface which is advantageous for sliding loading. In the run-in phase of the plain bearing, there is initially contact between the running surface of the bearing and the running surface of the running partner only at the highest points of the surface structuring. The intermediate spaces between the raised regions of the surface structuring can be filled with lubricant and thus ensure a gentle run-in operation. If abrasive particles arise during the run-in operation, these can escape into the intermediate spaces and be removed from the bearing region or absorbed by the layer material. The running-in of bearings is associated with a constant, albeit small removal of the exposed, raised regions of the hard material particles. After completion of the run-in operation, there is a leveled surface, and the layer system consists of wear-resistant structural elements having a supporting action, specifically the hard material particles and also comparatively soft, ductile intermediate regions. For this purpose, the layer system preferably has at least one layer which consists of a material having a hardness of at least 80 HV 0.1 and at most 250 HV 0.1.

The hard material particles preferably have a uniform size. This means that the extent $d_i$ of the individual particles fluctuates only slightly around the mean value d of the extent of all the hard material particles. The extent $d_i$ of an individual particle is to be understood here as meaning the diameter of a sphere of the same volume as the particle. The more uniform the size of the hard material particles, the easier it is to adapt the thickness $s_1$ of the first layer in such a way that on the one hand sufficient fixing of as many hard material particles as possible is achieved and on the other hand as many hard material particles as possible contribute to the formation of the surface structuring. Although small hard material particles can already be fixed with small layer thicknesses, they can disappear completely in the layer with an increasing layer thickness. Although large hard material particles are very helpful in the production of a surface structuring, they require a relatively large layer thickness in order to be fixed. It is preferable that the standard deviation of the size distribution of the hard material particles amounts to at most 10% of the mean value of the size distribution.

According to the invention, the thickness $s_1$ of the first layer is such that it amounts to at least 60% and at most 90% of the mean extent d of the hard material particles. This criterion for dimensioning the layer thickness is suitable particularly when the hard material particles have a uniform size.

The hard material particles preferably have a shape without corners and edges. In particular, they can have an ellipsoidal or spherical shape.

In a preferred configuration of the invention, at least part of the hard material particles can have a protrusion beyond the first layer. The hard material particles are thus incorporated into the layer in such a way that part of the hard material particles protrudes beyond the layer in an insular manner. Depending on the shape of the particles, this protrusion of the particles can have the form of peaks or differently shaped elevations, for example. In the case of a layer system which consists of merely one layer, the protrusion of these particles itself then forms the surface structuring of the sliding element. The particular advantage of such a layer system is rapid running-in in combination with a simple and therefore cost-effective layer structure. In this case, the hard material particles should be embedded in the layer to an extent of at least 60% of their extent, in order to ensure adequate grasping. It is preferable that the hard material particles can be surrounded by the first layer at most over an extent of 90% of the extent thereof. The protrusion beyond the first layer then amounts to at least 10% of the extent of the hard material particles. This ensures a sufficient surface structuring.

A further aspect of the invention encompasses a sliding element, which consists at least of a main body and a layer system applied thereto. The main body can in this respect preferably comprise a component which consists of a metallic bearing material. The layer system comprises at least a first layer of the thickness $s_1$, which is applied to the main body, and hard material particles having a mean extent d, which are introduced into the first layer and are therefore at least fixed on the main body. In this case, at least part of the hard material particles has a protrusion beyond the first layer. According to the invention, a second layer of the thickness $s_2$ is applied to the first layer and surrounds the hard material particles. The thicknesses $s_1$ and $s_2$ of the first and, respectively, second layer in this case are such that the sum total thereof amounts to at least 60% and at most 90% of the mean extent d of the hard material particles. According to the invention, the hard material particles form a surface structuring of the sliding element.

The combination according to the invention of the first and second layer makes it possible to improve the sliding properties of the bearing and to optimally adapt the layer system to boundary conditions, for example bearing loading, operating temperature, abrasive particles and upper cost limit. Some layers which have very good sliding properties are not suitable for fixing hard material particles on predefined base materials. In such cases, it can be advantageous initially to only fix the hard material particles with a first, relatively thin layer on the main body and then to apply the actually desired layer as a second layer to the first layer between the already fixed hard material particles. In this way, the hard material particles are surrounded and the grasping thereof is strengthened. In order that a significant surface structuring is formed after the second layer has been applied, the hard material particles have to have a sufficient protrusion beyond the first layer. In order to satisfy these requirements, the thicknesses $s_1$ and $s_2$ of the first and, respectively, second layer in this case are such that the sum total thereof amounts to at least 60% and at most 90% of the mean extent d of the hard material particles. The inventive advantages arise analogous to the case in which the hard material particles are surrounded only by one layer.

Furthermore, it can be advantageous to apply one or more further layers to the second layer.

In the case of layer systems having two or more layers, too, it is possible that parts of the hard material particles protrude like islands out of the surface of the topmost layer of the layer system or that the hard material particles are covered by the topmost layer of the layer system, but the entire layer system is configured in such a way that a topography with raised regions is formed on the surface of the layer system.

In a particularly advantageous embodiment of the invention, at least part of the hard material particles can have a protrusion beyond the second layer. The hard material particles are thus surrounded by the second layer in such a way that part of the hard material particles protrudes beyond the layer in an insular manner. In this embodiment, the protrusion of these particles can itself form the surface structuring of the sliding element. The particular advantage of such a layer system is rapid running-in on the one hand and an optimally adaptable topmost layer on the other hand. In particular, the second layer can be selected independently of the material of the main body of the sliding element. The thickness $s_2$ of the second layer should be such that the hard material particles are embedded in the layers to an extent of at least 60% of their extent, in order to ensure adequate grasping. It is preferable that the hard material particles can be surrounded by the first and second layer at most over an extent of 90% of the extent thereof. The protrusion then amounts to at least 10% of the extent thereof. This ensures a sufficient surface structuring.

The thicknesses $s_1$ and $s_2$ of the first and, respectively, second layer are such that the sum total thereof amounts to at least 60% and at most 90% of the mean extent d of the hard material particles. This criterion for dimensioning the layer thicknesses is suitable particularly when the hard material particles have a uniform size.

In the case of a layer system having at least two layers, it is preferable that the thickness $s_1$ of the first layer can amount to at least 10% and at most 30% of the mean extent d of the hard material particles. Sufficient temporary fixing of the hard material particles combined with a small thickness of the first layer is possible as a result. The hard material particles are then further surrounded and incorporated into the layer system by the second layer, which is applied to the first layer.

It is preferable that the hard material particles can be fixed on the main body in the form of a monolayer. In this case, all of the hard material particles can have approximately the same spacing from the surface of the main body, and they are preferably positioned in the immediate vicinity of the surface of the main body. Such an arrangement of the hard material particles can be achieved, for example, by sedimentation. The particular advantage of a monolayer of hard material particles is the efficient utilization of the quantity of hard material particles used: ideally, every hard material particle contributes to the surface structuring of the sliding element and no particle is concealed by particles lying thereabove. It is therefore possible for a relatively thin layer system to have the desired functionality to the full extent. In the case of a monolayer of hard material particles, the layer system as a whole is barely thicker than the mean dimension d of the hard material particles.

In an advantageous embodiment of the invention, the hard material particles can have a substantially spherical shape. The hard material particles therefore preferably have approximately an ideal sphere shape. Deviations from the ideal sphere shape in the context of common manufacturing tolerances are permissible, however. In this embodiment, the extent $d_i$ of the hard material particles is described by the particle diameter. In this embodiment, too, it is expedient if the hard material particles have a uniform size. The spread of the particle diameter should therefore be small. The advantages achieved with this embodiment of the invention consist in particular in the fact that the geometrically virtually perfectly rounded particle peaks promote the gentle run-in operation and minimize the abrasive wear of the counter running surface.

In an advantageous embodiment of the invention, the hard material particles can consist of silicon dioxide. Spherical particles of silicon dioxide have advantageous tribological properties. In addition, they are commercially available in a high quality. Alternatively, it is also possible to use spherical particles of boron carbide. It was possible to achieve surprisingly good results with boron carbide, too. A combination of particles of silicon dioxide and boron carbide in a layer system can also be used.

In a preferred embodiment, the mean extent d of the hard material particles can amount to at least 1 μm and at most 20 μm. It is particularly preferable that the mean extent of the hard material particles can amount to at least 3 μm and at most 15 μm. In particular, the mean extent of the hard material particles can amount to at least 5 μm and at most 10 μm. The smaller the mean extent of the hard material particles, the more difficult it is to embed them in layers in such a way that a sufficient surface structuring is formed. The greater the mean extent d of the hard material particles, the thicker the layer system has to be. For reasons of cost, however, there is an interest in thin layer systems. It is preferable that the entire thickness of the layer system amounts to at most 20 μm. Furthermore, the accuracy of fit of the bearing pair becomes poorer with an increasing layer thickness. Thicker layers have a greater absolute fluctuation of the layer thickness given the same relative accuracy of the layer thickness. In the case of sliding elements, dimensional tolerances of at most 1 μm are conventionally to be observed. This is all the more difficult to achieve the greater the thickness of the layer system.

In a further advantageous embodiment of the invention, hard material particles can be present over 10% to 50% of the surface of the layer system which is remote from the main body. If hard material particles are present over less than 10% of the surface of the layer system which is remote from the main body, the supporting action of the wear-resistant structural elements is too small. It is particularly preferable that hard material particles can be present over at least 20% of the surface of the layer system which is remote from the main body, so that a sufficient supporting action is achieved. If hard material particles are present over more than 50% of the surface of the layer system which is remote from the main body, the intermediate spaces between the individual hard material particles are too small to be able to receive abrasive particles to a sufficient degree. It is particularly preferable that the proportion of the surface which is occupied with hard material particles amounts to at least 20% and at most 30%. The number of hard material particles per unit area is to be chosen suitably depending on the particle size.

In the case of a sliding element according to the invention having a layer system, the first layer can advantageously be chemically deposited nickel. Hard material particles, for example silicon dioxide particles, can be fixed particularly easily by a layer of chemically deposited nickel. In the case of chemically deposited nickel layers, the layer thickness can preferably amount to 2 to 3 μm. A layer thickness of 2 μm represents the lower limit, down to which layers of this type can be applied in a reproducible manner. Since, on the other hand, layers of this type are relatively complex, it is desirable to keep the layers thin. An optimum range of the layer thickness of at least 2 μm and at most 3 μm can be derived therefrom.

Particularly advantageously, it may be the case that, in a layer system according to the invention having at least two layers, the second layer is a chemically deposited or electrodeposited layer, the hardness of which amounts to at least 80 HV 0.1 and at most 250 HV 0.1. In the regions between the hard material particles, there is therefore preferably a layer made of a relatively soft, ductile material. It is thus ensured that vagrant foreign particles between the running surfaces of the bearing partners can be pressed into the soft layer and are thereby made harmless.

It is possible that the first and the second layer differ in their chemical composition. It is also possible that the second layer is applied by a different method to the first layer. In particular, it may be expedient to apply two layers of identical material by different methods. Furthermore, the second layer can have a different roughness on its surface to the first layer. In particular, the second layer can have a greater roughness than the first layer. The greater roughness makes it possible to form regions which serve as a reservoir for lubricant.

In a further particularly preferred embodiment, further particles having a considerably smaller extent than the hard material particles can be incorporated in the second layer. These further particles can be in particular hard material particles or lubricant particles. They improve the wear resistance and the tribological properties of the layer system.

In a further advantageous embodiment, the surface of the layer system which is remote from the main body can have recesses between the hard material particles. In this case, at least part of the recesses is spaced apart from neighboring hard material particles. In this context, the term 'recess' does not mean the regions between the hard material particles which lie deeper in relation to the raised regions of the hard material particles, but instead it means local, preferably trough-shaped recesses at points between the individual hard material particles. The deepest points of these recesses in this case lie at a level beneath the average surface of the outer layer of the layer system. The particular advantage of these recesses consists in an improvement in the tribological properties of the bearing system. On the one hand, these recesses can form a reservoir for lubricant, and on the other hand foreign particles can be received particularly well by these recesses and can thereby be made harmless.

Particularly advantageously, it may be the case here that the extent of the recesses is approximately equal to the mean extent d of the hard material particles. As a result, it is also possible for foreign particles of this size to be received particularly well and to thereby be made harmless. Recesses of this nature can arise if hard material particles are not fixed adequately on the main body by the first layer. The hard material particles break out of the fixing layer even under a low level of loading and leave behind corresponding recesses in the layer. If a further layer is applied to the first layer, the recesses in the first layer are not filled by the second layer, but rather are reproduced in the height profile of the second layer. The reproduction can be described in rough approximation as true-contoured. The original recesses in the first layer can therefore still be identified on the surface of the second layer.

In a particularly preferred embodiment of the invention, recesses can be present over 10% to 50% of the surface of the layer system which is remote from the main body. If recesses are present over less than 10% of the surface of the layer system which is remote from the main body, the advantageous effect of the recesses is too small. If recesses are present over more than 50% of the surface of the layer system which is remote from the main body, the layer system as a whole is too unstable.

Figure 2:
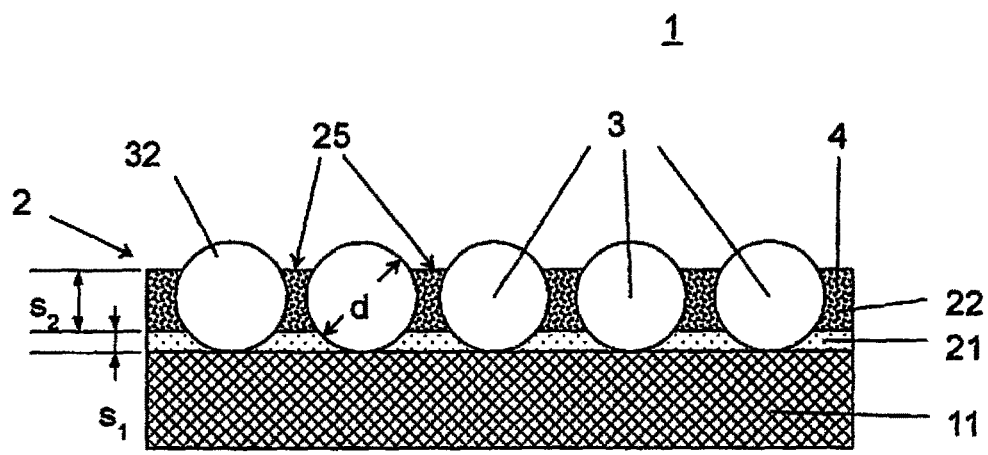
Figure 3:
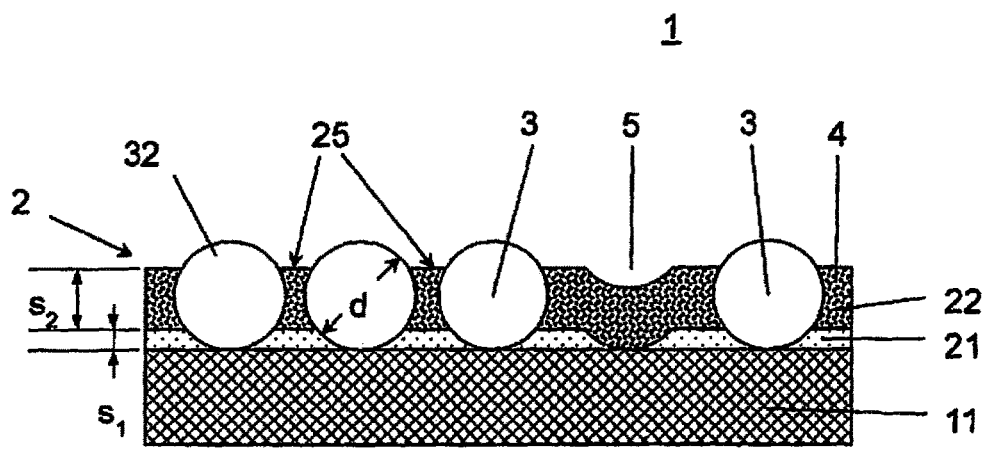

Exemplary embodiments of the invention will be explained in more detail on the basis of the schematic drawings, in which:

FIG. 1 shows a cross section through a sliding element having a layer system comprising hard material particles and a first layer, FIG. 2 shows a cross section through a sliding element having a layer system comprising hard material particles, a first layer and a second layer, FIG. 3 shows a cross section through a sliding element having a layer system comprising hard material particles, a recess, a first layer and a second layer.

Mutually corresponding parts are provided with the same reference signs in all the figures.

FIG. 1 schematically shows a cross section through a sliding element 1 according to the invention having a main body 11 and having a layer system 2. The layer system 2 comprises a first layer 21, in which hard material particles 3 are fixed and surrounded. The hard material particles 3 have a spherical shape and a uniform size. They form a monolayer and are located in the immediate vicinity of the surface of the main body 11. The thickness $s_1$ of the first layer 21 amounts to approximately 75% of the diameter d of the hard material particles 3. Therefore, the hard material particles 3 have a protrusion 32 beyond the surface 25 of the layer system 2 which is remote from the main body 11. The protrusion 32 amounts to approximately 25% of the diameter d of the hard material particles 3. The first layer 21 can contain further particles.

FIG. 2 schematically shows a cross section through a sliding element 1 according to the invention having a main body 11 and having a layer system 2. The layer system 2 comprises hard material particles 3, a first layer 21 and a second layer 22. The hard material particles 3 have a spherical shape and a uniform size. They form a monolayer and are located in the immediate vicinity of the surface of the main body 11. The hard material particles 3 are fixed on the surface of the main body 11 by the first layer 21. The thickness $s_1$ of the first layer 21 amounts to approximately 20% of the diameter d of the hard material particles 3. The hard material particles 3 are surrounded by the second layer 22. The thickness $s_2$ of the second layer 22 has been chosen in such a way that the hard material particles 3 are surrounded by the first layer 21 and the second layer 22 to an extent of approximately 75% of the diameter d thereof. Therefore, the hard material particles 3 have a protrusion 32 beyond the surface 25 of the layer system 2 which is remote from the main body 11. The protrusion 32 amounts to approximately 25% of the diameter of the hard material particles 3. The second layer 22 contains further particles 4, the size of which is considerably smaller than the diameter d of the hard material particles 3.

FIG. 3 schematically shows a cross section through a sliding element 1 according to the invention having a main body 11 and having a layer system 2. As in the case of the sliding element 1 shown in FIG. 2, the layer system 2 shown in FIG. 3 comprises hard material particles 3, a first layer 21 and a second layer 22. In addition, a recess 5 is shown in the outer surface 25 of the layer system 2. The recess 5 is spaced apart from the neighboring hard material particles 3. As is shown, the first layer 21 already has a recess there. At this point, a hard material particle 3 is broke out of the first layer 21 after the application of the first layer 21 and before the application of the second layer 22. The second layer 22 was applied with a constant layer thickness 62, and therefore the recess formed by the hard material particle 3 breaking out in the first layer 21 is reproduced again on the surface of the second layer 22. The recess 5 can be seen in the height profile of the second layer 22.

An embodiment as per FIG. 3 was investigated. Hard material particles 3 of silicon dioxide were fixed on a metallic main body 11 by means of a first layer 21 of chemically deposited nickel. The mean diameter of the silicon dioxide particles was 8 μm. The thickness $s_1$ of the fixing layer 21 was approximately 2 to 3 μm. Investigations of the sample after this first coating step show that some of the silicon dioxide particles 3 have been lost after the application of the fixing layer 21. These particles left behind recesses of a corresponding size in the fixing layer 21. In a second coating step, the silicon dioxide particles 3 were surrounded by an electrodeposited copper layer 22. Furthermore, particles 4 of hexagonal boron nitride were dispersed in this layer. Investigations of the sample after the second coating step show that the recesses originally established in the fixing layer 21 were not leveled during the application of the surrounding layer 22, but rather can clearly be identified in the surface 25 of the surrounding layer 22. As a whole, the surface produced exhibits a copper layer 22 of coarse crystallinity comprising incorporated silicon dioxide particles 3 and a multiplicity of recesses 5. The occupation density of the silicon dioxide particles 3 amounts to between 4000 and 5000 particles per mm². In further SEM investigations, particles 4 of hexagonal boron nitride were also detected on the surface.

Tribological investigations designed as an endurance test were carried out on this sample. To simulate the run-in behavior, at the start of the test the loading of the frictional surface was increased gradually up to a contact pressure of 9.0 N/mm². The sliding speed was 1 m/s and the operating temperature was 120° C. A comparative test was carried out with an uncoated plain bearing material. The samples were analyzed after a test duration of 6 hours.

After completion of the run-in phase, the coated sample exhibits a coefficient of friction which lies approximately 25% to 30% below that of the uncoated plain bearing material. Furthermore, after the test this sample exhibits a clearly leveled surface comprising a multiplicity of recesses 5 having a diameter which is slightly smaller than the mean diameter of the silicon dioxide particles 3. The majority of the recesses 5 are at least partially filled. It is probable that the material which fills the recesses 5 is material removed from the surrounding layer, i.e. copper. It is striking that this material often has a porous structure in the recesses 5. The originally raised regions of the embedded silicon dioxide particles 3 have largely been removed after the test, and therefore the sliding element 1 has a leveled surface 25.

LIST OF REFERENCE SIGNS

1 Sliding element
11 Main body
2 Layer system
21 First layer
22 Second layer
25 Surface of the layer system
3 Hard material particles
32 Protrusion
4 Further particles
5 Recess

The invention claimed is:

1. A sliding element comprising a main body and a coating layer system applied on the main body, the coating layer system comprising a first coating layer applied directly on the main body and having a thickness $s_1$, and material particles introduced into the first coating layer with regions of the first coating layer being provided between material particles, wherein the material particles have a hardness greater than the hardness of the regions of the first coating layer provided between the material particles, the material particles have a mean extent d and are fixed on the main body, the thickness $s_1$ of the first coating layer is from 60-90% of the mean extent d of the material particles and the material particles form a surface structuring of the sliding element.

2. The sliding element (1) according to claim 1, characterized in that at least part of the material particles protrudes beyond the first layer.

3. The sliding element according to claim 2, characterized in that the material particles are surrounded at most over an extent of 90% thereof.

4. The sliding element (1) according to claim 1, characterized in that the material particles are fixed on the main body in the form of a monolayer.

5. The sliding element according to claim 1, characterized in that the material particles have a substantially spherical shape.

6. The sliding element according to claim 1, characterized in that the material particles consist of silicon dioxide and/or boron carbide.

7. The sliding element according to claim 1, characterized in that the mean extent d of the material particles amounts to at least 1 μm and at most 20 μm.

8. The sliding element according to claim 1, characterized in that material particles are present over 10% to 50% of the surface of the layer system which is remote from the main body.

9. The sliding element according to claim 1, characterized in that the first layer is chemically deposited nickel.

10. The sliding element according to claim 1, characterized in that the surface of the layer system which is remote from the main body has recesses between the material particles and at least part of the recesses is spaced apart from neighboring material particles.

11. The sliding element according to claim 10, characterized in that the extent of the recesses is approximately equal to the mean extent d of the material particles.

12. The sliding element according to claim 10, characterized in that recesses are present over 10% to 50% of the surface of the layer system which is remote from the main body.

13. The sliding element according to claim 10, wherein a lubricant is provided in the recesses.

14. A sliding element comprising a main body and a coating layer system applied on the main body, the coating layer system comprising a first coating layer applied directly on the main body and having a thickness $s_1$, a second coating layer having a thickness $s_2$ applied on the first coating layer and material particles introduced into the first coating layer with regions of the first coating layer being provided between the material particles, wherein the material particles have a hardness greater than the hardness of the regions of the first coating layer provided between the material particles, the material particles have a mean extent d and are fixed on the main body, the combined thicknesses $s_1$ and $s_2$ of the first and second coating layers is from 60-90% of the mean extent d of the material particles and the material particles form a surface structuring of the sliding element.

15. The sliding element according to claim 14, characterized in that at least part of the material particles protrudes beyond the second layer.

16. The sliding element according to claim 14, characterized in that the thickness $s_1$ of the first layer amounts to at least 10% and at most 30% of the mean extent d of the material particles.

17. The sliding element according to claim 14, characterized in that the second layer is a chemically deposited or electrodeposited layer, the hardness of which amounts to at least 80 HV 0.1 and at most 250 HV 0.1.

18. The sliding element according to claim 17, characterized in that further particles having a considerably smaller extent than the material particles are incorporated in the second layer.

* * * * *